Figure 1:
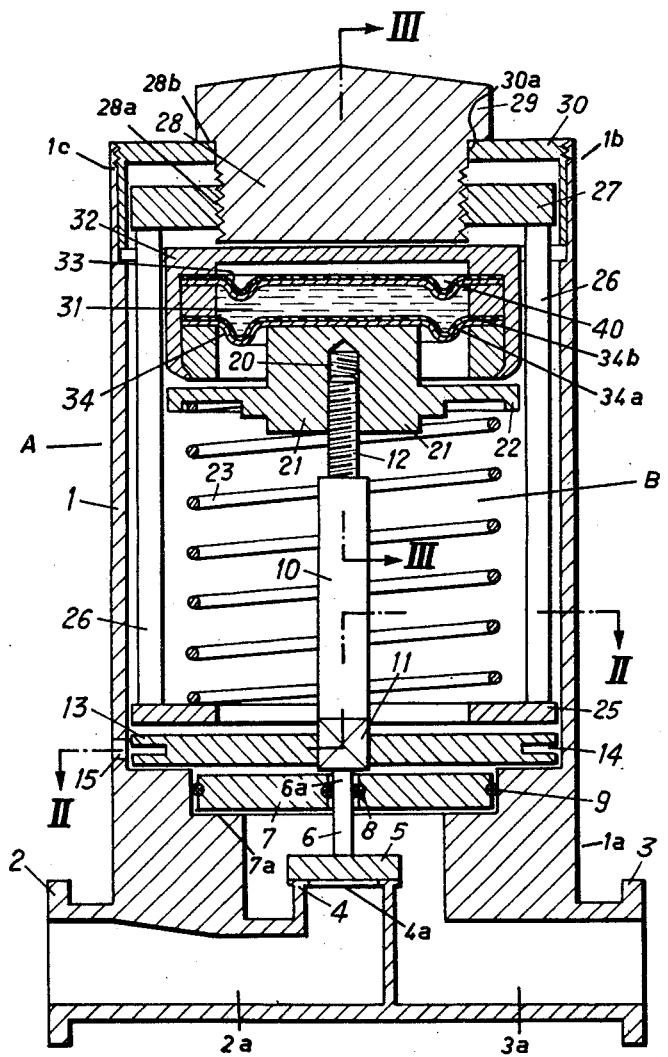

Dec. 11, 1962 B. MEIER 3,067,944
TEMPERATURE CONTROLLED RADIATOR VALVE
Filed Nov. 16, 1960 2 Sheets-Sheet 1

INVENTOR.
Bernhard Meier
BY
Werner W. Kleeman
Attorney

Dec. 11, 1962 B. MEIER 3,067,944
TEMPERATURE CONTROLLED RADIATOR VALVE
Filed Nov. 16, 1960 2 Sheets-Sheet 2
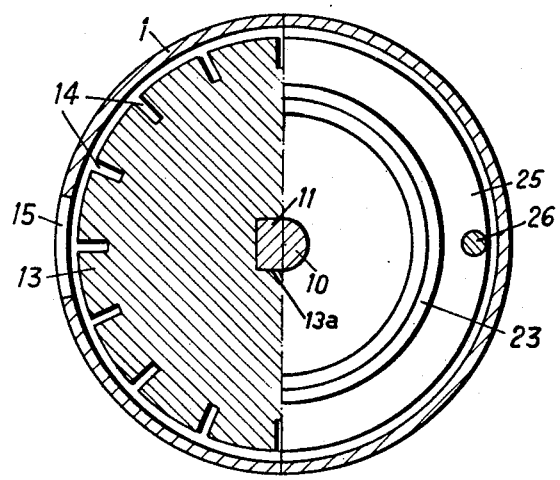
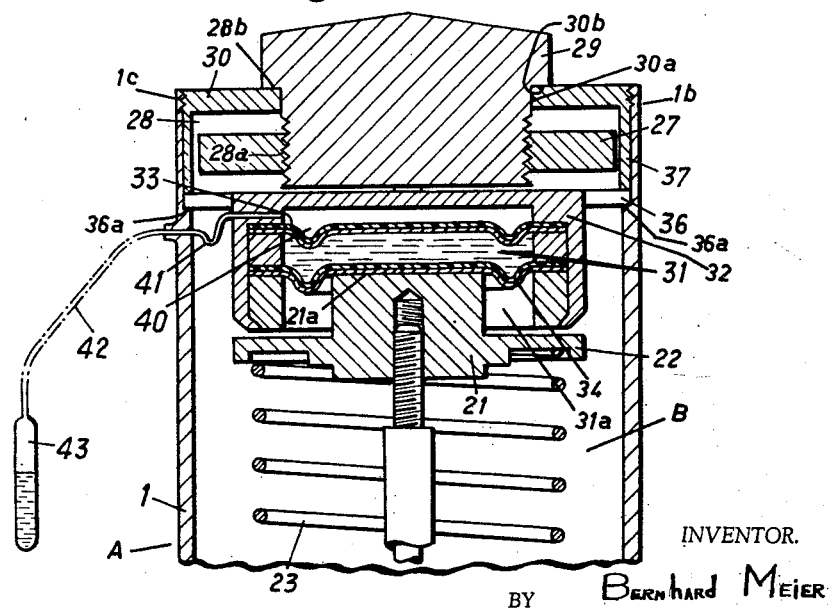
INVENTOR.
BY Bernhard Meier
Werner W. Kleeman
Attorney

United States Patent Office 3,067,944
Patented Dec. 11, 1962

3,067,944
TEMPERATURE CONTROLLED RADIATOR VALVE
Bernhard Meier, Gossau, Zurich, Switzerland
Filed Nov. 16, 1960, Ser. No. 69,712
Claims priority, application Switzerland Nov. 23, 1959
11 Claims. (Cl. 236—42)

The present invention relates to a novel temperature controlled radiator valve of the type wherein the movable valve member controlling the flow of a heating medium is biased by adjustable resilient pressure and the pressure of a control medium.

It is a primary purpose of such radiator valves to control the quantity of the medium passing through the radiator depending on the temperature of the room to be heated. It is therefore necessary to provide a temperature feeler or sensing element which is influenced not by the temperature of the radiator itself but by the temperature of the ambient space. This temperature feeler must be operatively connected with the radiator by a suitable connecting member.

The radiator valve according to the present invention is characterized by the fact that the control medium is of the type which remains in the saturated vapor state throughout the temperature range encountered. The portion of the control medium located in the control chamber of the valve assembly is gaseous and the control chamber is connected with the temperature feeler unit which is located externally of the valve assembly by means of a capillary tube. In radiator valves of the type described it is important that an adjustment is provided which enables the mobile valve member to be correspondingly positioned in accordance with its temperature control function in dependence upon the particular pressure conditions prevailing in the control medium. In the valve according to this invention, the mobile valve member may therefore be equipped with an indexing disk that can be operated only by means of a tool, wherein the distance between the mobile valve member and a displaceable piston member serving as a control member may be adjusted.

Accordingly, it is an important object of the present invention to provide a novel temperature controlled valve readily suitable for use as a radiator valve which is simple in construction, easy to assemble and yet highly reliable in operation.

Another object of the present invention is to provide a novel type radiator valve adapted to adjust flow conditions of a suitable heating medium in response to temperature conditions prevailing in an ambient space.

It is a further object of the present invention to provide means for initially setting the position of a movable valve member with respect to its valve seat in accordance with the conditions of an area to be temperature controlled.

A further object of the present invention is to provide means for biasing and altering the position of a movable valve member in accordance with pressure exerted by a saturated vapor responding to prevailing temperatures appearing in a space to be controlled.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:
FIG. 1 is a longitudinal cross-sectional view of a radiator valve according to the present invention;
FIG. 2 is a cross-sectional view of the radiator valve shown in FIG. 1, taken along the line II—II thereof; and
FIG. 3 is a longitudinal section of a portion of the valve shown in FIG. 1 and taken along the line III—III thereof.

Referring now to the drawings, the temperature controlled or responsive radiator valve A disclosed in FIGURE 1 comprises a hollow main valve body 1 provided at one and 1a thereof with the duct connections 2, 3 defining a flow passageway 2a, 3a for the medium to be controlled, as for example, hot water. The duct connections 2, 3 are shown arranged substantially normal to the longitudinal axis of the main valve body 1 and are adapted to be directly connected to a radiator in a manner such that the main valve body 1 communicates with both the radiator and a suitable supply line (not shown). Arranged in the flow passageway 2a, 3a between the two duct connections 2, 3 is a valve seat 4 having an opening 4a which may be closed by a movable valve member, such as a valve disk 5, in such a manner that the flow passageway 2a, 3a defined by the duct connections 2, 3 is interrupted.

The movable valve member 5 is actuated by a rotatable and reciprocable cylindrical rod 6 which extends in the direction of an annular chamber 7a adapted to receive a sealing disk 7. The rod 6 passes centrally through the sealing disk 7, the latter of which is provided with the sealing rings 8 and 9 which ensure that the controlled medium flowing through the duct connections 2, 3 will not pass into the valve control compartment B located above the sealing disk 7. The sealing rings 8 and 9 will not, however, impair the mobility of the rod member 6 for carrying out axial or rotational movement.

At the upper end 6a of the rod member 6 there is supported a piston rod 10 and a connecting member 11 which may be of square cross-section (see FIGURE 2) and interposed between the respective rod members 6 and 10. The upper end of the piston rod 10 terminates in a threaded spindle portion 12 adapted to be received in a correspondingly threaded bore 20 of a piston member 21. An indexing plate or actuating disk 13 provided with a central opening 13a (see FIGURE 2) is carried by the square-shaped connecting member 11. The indexing disk 13 is provided at its circumference with a plurality of spaced and inwardly directed recesses or bores 14. Slot means 15 are arranged in the wall of the main valve body 1 substantially at the height of the indexing disk 13, which slot means permit insertion of a suitable tool for engaging the recesses 14 to carry out an indexing or rotation of said indexing disk 13. The length of the slot means 15 is preferably made greater than the distance between two adjacent recesses 14 so that it is readily possible to index the disk 13, which allows the position of the movable valve member 5 to be altered through a corresponding rotation of the spindle 12. The spindle 12 engages the piston body 21 provided with the threaded bore 20 and is axially displaceable therein. As will be more fully described hereinafter, the piston body 21 is biased by means of a resilient spring 23, the pressure exerting effect of which may be adjusted, and further, by means of a pressure counteracting that of said spring 23, the magnitude of which changes in dependence upon the temperature of the room under consideration.

The piston member 21 includes a laterally extending dish-shaped portion 22 against which the upper end of a helical spring 23 normally rests. The lower end of the helical spring 23 is carried by a supporting ring 25 located adjacent the indexing disk 13. The supporting ring 25 is connected, for example, by a pair of pull rods 26 with a collar or nut 27 arranged above the piston member 21. The collar member 27 engages the outer threads 28a of a member 28 including a calibrated actuation knob or dial portion 29 designed to adjust the temperature desired for the room.

The upper end 1b of the main valve body 1 is effectively obturated by a threaded cover member 30 engaging the internal threads 1c provided on said upper end 1b of said valve body 1. The cover member 30 is further provided with a central bore 30a into which the member 28 is seated and extends internally of the valve body 1. In view of the fact that the dial or knob portion 29 arranged externally of the main valve body 1 is of greater diameter than the threaded portion 28a, the shoulder 28b formed by the different diameters of the member 28 and dial portion 29 engages the outer surfaces or edge 30b of the cover member 30 adjacent the central bore 30a.

The helical spring 23 may be compressed during each adjustment of the knob member 29 with respect to its normal position so that it will tend to space the dish-shaped portion 22 of the piston 21 and the axially shiftable supporting ring or plate 25 from one another, that is to say, said spring 23 will tend to displace dish-shaped portion 22 upwardly and the supporting ring 25 downwardly. Owing to this action, the pull rods 26, the collar 27 and the knob member 28 will be subjected to a downwardly directed pull such that the shoulder 28b of the knob portion 29 will always be forced into surface contact with the outer surface 30b of the cover member 30. It will readily be appreciated that the axial position of the collar 27 and, accordingly, the axial position of the supporting ring 25 can be adjusted by rotating the dial portion 29, which will correspondingly also change the pressure which the helical spring 23 exerts on the dish-shaped portion 22 of the piston member 21.

The upper boundary surface 21a of the piston member 21 engages the lowermost diaphragm 34 of a pair of flexible, spaced diaphragms 33 and 34 defining therebetween a pressure transmitting chamber 31 adapted to retain a suitable fluid medium as will be more fully described hereinafter. The pair of spaced diaphragms 33 and 34 are suitably supported in a diaphragm housing member 32. As is clearly shown in the drawings, each diaphragm member 33 and 34 may be formed of two layers, by way of example, by a sealing layer formed of rubber 34b and a supporting layer 34a formed of nylon. It is essential that the compartments or spaces 31a and 40 separated by the diaphragms 33 and 34 are perfectly sealed relative to one another. The intermediate chamber or compartment 31 between the two diaphragms 33 and 34 is filled with a suitable transmission medium, for example water, so that the pressure acting on the diaphragm 33 from above will become operative on the piston member 21. The arrangement of the two diaphragms 33 and 34 is provided to prevent the medium located in the upper compartment 40 above the diaphragm 33 from diffusing into the control space B in which the piston member 21 and the spring 23 are located. As best seen in FIG. 3, the housing 32 for the set of diaphragms 33 and 34 may, by way of example, be provided with radially or outwardly projecting pin means 36 at diametrically opposed locations which engage an annular shoulder 36a of the main valve body 1 in such a manner that the set of diaphragms 33 and 34 may be inserted in said valve body 1 from its upper end 1b. Provided above the pin means 36 is a sleeve or ring 37 which bears against the underside of the threaded cover 30. This ring 37 is designed to prevent the set of diaphragms 33 and 34 from being axially displaced in an upward direction under the influence of the resilient means or helical spring 23.

As can further clearly be seen in FIG. 3, the space or compartment 40 above the diaphragm 33 in the valve assembly A is connected via a conduit or line, diagrammatically depicted by the reference numerals 41 and 42, with a temperature sensing or feeler unit 43 including a vessel portion which is located at any selected point in the room to be heated. The system enclosed by the space 40, the conduit means 41 and 42 and the temperature sensing unit 43 is filled with a control medium which is in the saturated vapor state in the temperature range encountered, that is to say, is present in both a liquid and vapor state in the vessel as clearly shown in FIGURE 3.

Control mediums of this type and suitable for this purpose are known in the art. By way of example, hydrocarbons at least partially substituted with halogens may be employed. The conduits or lines 41 and 42 are preferably capillary tubes. In assembling the system, the control medium is preferably filled into the sensing or feeler unit 43 so that only the gaseous component of the control medium will pass into the other portions of the system, i.e. into the capillary lines 41 and 42 and into the compartment 40. It will readily be appreciated that this will build up a pressure in the compartment 40 which is dependent practically only on the temperature of the temperature feeler 43 since changes in the temperature of the valve assembly A will become operative only on the gaseous component the pressure of which is considerably less dependent on the temperature and for practical purposes may be considered negligible. It may further be assumed that the temperature of the radiator will vary within only narrow limits so that the use of the gaseous component of the control medium for transmission purposes will cause no falsification of the temperature control.

By means of the adjusting knob 29, the angular position of which may be graduated in degrees of temperature, the prestress or loading of the spring 23 can be adjusted, i.e., the pressure with which the spring 23 will bear against the dish-shaped portion 22 and, consequently, against the piston 21. The temperature dependent pressure of the feeler unit 43 is also operative on the piston member 21 so that the latter will assume a position of equilibrium. This position of equilibrium corresponds at a predetermined setting of the indexing disk 13 to a certain opening of the movable valve member 5 relative to its valve seat 4. The heating medium flowing from the duct connection 2 to the duct connection 3 is thus throttled at a temperature depending on the temperature of the feeler unit 43.

As explained hereinabove, the distance or spacing between the mobile valve member 5 and the piston member 21 may be adjusted by means of the indexing disk 13. This possibility of initial adjustment is required in the vast majority of cases in order to obtain an effective valve control action thru initial positioning of the valve 5 with respect to its seat 4. The degree of initial valve control corresponds to the factors present in practical operation. Certain of these factors which require consideration are the size of the radiator, the size of the room to be heated, temperature emission of the room, the temperature of the heating medium and so forth. This adjustment is necessary only once, by way of example after installation. This is why the provided adjustment by means of a tool such as a pin inserted in the bores 14 may be deemed to be satisfactory. If necessary, the slot 15 may be covered by a flap (not shown) after setting is effected. The aforementioned presetting operation permits effective control of the heating medium so as to compensate for heat losses from the area or room to be controlled.

Attention is called to the fact that all members involved in the temperature control of the room may be fitted into the valve body 1 and suspended therewithin by means of insertion through the opening located at the upper end 1b thereof so that the design proposed is most advantageous from the standpoint of manufacture and assembly. By way of example, it is possible to exchange the complete system participating in the temperature control when necessary without removing the valve body from the radiator. All parts are fixed and retained internally of the valve body 1 by means of the threaded cover 30 per se.

Having thus described the invention what is desired to be secured by United States Letters Patent is:

1. A temperature controlled valve adapted for use with a radiator comprising a hollow valve housing having duct means defining a flow passageway for a fluid medium, a valve seat having an opening disposed in said flow passageway, a valve disk mounted for axial movement arranged adjacent said valve seat and adapted to engage said valve seat to obturate, said flow passageway, sealing means disposed within said hollow valve housing in the vicinity of said valve disk for preventing entry of fluid medium from said duct means into a remaining portion of said valve housing defining a control chamber, a displaceable piston member located in said control chamber and in registry with said valve disk to displace the latter relative to said valve seat, a diaphragm housing including a set of spaced diaphragms defining an upper, intermediate and lower compartment disposed in said control chamber adjacent said piston member, a pressure transmitting medium located in said intermediate compartment, resilient means cooperable with said piston members to normally urge the latter into said lower compartment against said diaphragm means, and temperature responsive means including a vaporized medium responsive to external temperature conditions communicating with said upper compartment and said diaphragm means to exert a pressure counteracting said resilient means via said pressure transmitting medium.

2. In a temperature controlled valve adapted for use with a radiator, the improvement of, a hollow valve housing having duct means defining a flow passageway for a fluid medium, a valve seat having an opening disposed in said flow passageway, a valve disk mounted for rotation and axial movement arranged adjacent said valve seat and adapted to engage said valve seat to obturate said flow passageway, sealing means disposed within said hollow valve housing in the vicinity of said valve disk for preventing entry of fluid medium from said duct means into a remaining portion of said valve housing defining a control chamber, a displaceable piston member located in said control chamber and in registry with said valve disk to displace the latter relative to said valve seat, a diaphragm housing including a set of spaced diaphragms defining an upper, intermediate and lower compartment disposed in said control chamber adjacent said piston member, a pressure transmitting medium located in said intermediate compartment, resilient means cooperable with said piston member to normally urge the latter into said lower compartment against said diaphragm means, and temperature responsive means including a vaporized medium responsive to external temperature conditions communicating with said upper compartment and said diaphragm means to exert a pressure counteracting said resilient means via said pressure transmitting medium.

3. In a temperature controlled valve according to claim 2, including an indexing disk cooperable with said valve disk for presetting the position of said valve disk relative to said valve seat.

4. In a temperature controlled valve according to claim 3, wherein said indexing disk is provided with a plurality of circumferentially arranged recesses adapted to receive an indexing tool, said valve housing being provided with a slotted opening adjacent said indexing disk for permitting insertion of said indexing tool.

5. In a temperature controlled valve according to claim 3, including adjustable connecting means interconnecting said valve disk and said piston member, said connecting means including a piston rod including a threaded spindle portion engageable with said piston member, said indexing disk being carried by said piston rod.

6. In a temperature controlled valve according to claim 2, including a supporting plate located in said control chamber remote from said piston member for carrying said resilient means.

7. In a temperature controlled valve according to claim 6, including means cooperating with said supporting plate for advancing the latter toward said piston member to compress said resilient means.

8. In a temperature controlled valve according to claim 7, said advancing means including a manually operated knob member normally urged in the direction of said piston member by said resilient means.

9. In a temperature controlled valve according to claim 2, said temperature responsive means including a vessel arranged externally of said valve housing and capillary means communicating the interior of said vessel with said upper compartment so that only said vaporized medium may act on said diaphragm means.

10. In a temperature controlled valve adapted for use with a radiator, the improvement of, a hollow valve housing having duct means defining a flow passageway for a fluid medium, a valve seat having an opening disposed in said flow passageway, a valve disk mounted for rotation and axial movement arranged adjacent said valve seat and adapted to engage said valve seat to obturate said flow passageway, sealing means disposed within said hollow valve housing in the vicinity of said valve disk for preventing entry of fluid medium from said duct means into a remaining portion of said valve housing defining a control chamber, a displaceable piston member located in said control chamber and in registry with said valve disk to displace the latter relative to said valve seat, a diaphragm housing including a pair of spaced upper and lower diaphragm means disposed in said control chamber adjacent said piston member, said pair of spaced diaphragm means forming an upper, intermediate and lower compartment, resilient means cooperable with said piston member to normally bias the latter in said lower compartment against said lower diaphragm means, and temperature responsive means including a vaporized medium responsive to external temperature conditions communicating with said upper compartment with said vaporized medium bearing directly against said upper diaphragm means to exert a pressure counteracting said resilient means, said intermediate compartment being provided with a pressure transmitting medium for transmitting the pressure of said vaporized medium directly to said piston member which pressure transmitting medium together with said pair of diaphragm means serves to seal said vaporized medium in said upper compartment.

11. In a temperature controlled valve adapted for use with a radiator, the improvement of, a hollow valve housing having duct means defining a flow passageway for a fluid medium, a valve seat having an opening disposed in said flow passageway, a valve disk mounted for rotation and axial movement arranged adjacent said valve seat and adapted to engage said valve seat to obturate said flow passageway, sealing means disposed within said hollow valve housing in the vicinity of said valve disk for preventing entry of fluid medium from said duct means into a remaining portion of said valve housing defining a control chamber, a displaceable piston member located in said control chamber and in registry with said valve disk to displace the latter relative to said valve seat, a diaphragm housing including a set of spaced diaphragms defining an upper, intermediate and lower compartment disposed in said control chamber adjacent said piston member, a pressure transmitting medium located in said intermediate compartment, resilient means cooperable with said piston member to normally urge the latter into said lower compartment against said diaphragm means, and temperature responsive means including a vaporized medium responsive to external temperature conditions communicating with said upper compartment and said diaphragm means to exert a pressure counteracting said resilient means via said pressure transmitting medium, said hollow valve housing being internally provided with shoulder means, pin means associated with said diaphragm housing carried by said shoulder means, and cover means including a sleeve portion maintaining said pin means seated on said shoulder means to fixedly secure said diaphragm housing internally of said hollow valve housing.

References Cited in the file of this patent

UNITED STATES PATENTS

| | | |
|---|---|---|
| 1,668,896 | Giesler | May 8, 1928 |
| 1,706,744 | Reeder | Mar. 26, 1929 |
| 1,875,513 | Smith | Sept. 6, 1932 |
| 2,201,375 | Newell | May 21, 1940 |
| 2,241,326 | Selby | May 6, 1941 |
| 2,938,384 | Soreng et al. | May 31, 1960 |